J. H. HERRIFF.
OIL BURNER.
APPLICATION FILED APR. 15, 1909.
949,073.
Patented Feb. 15, 1910.
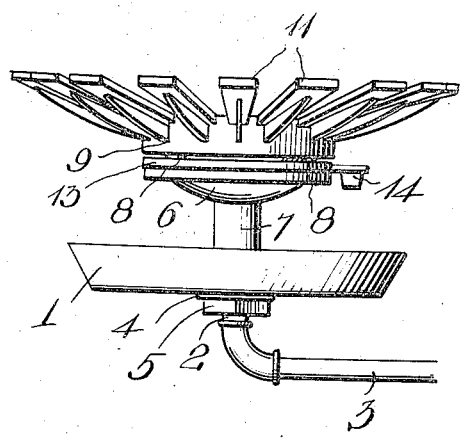
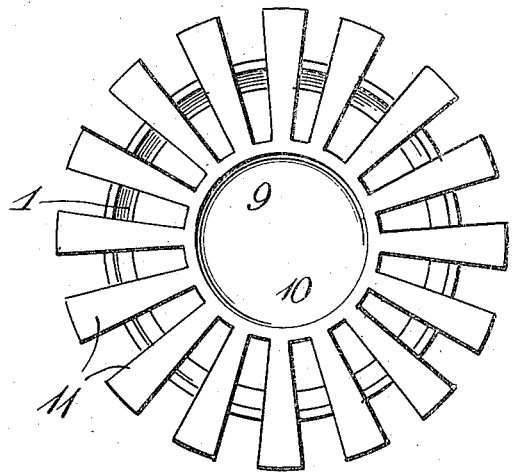
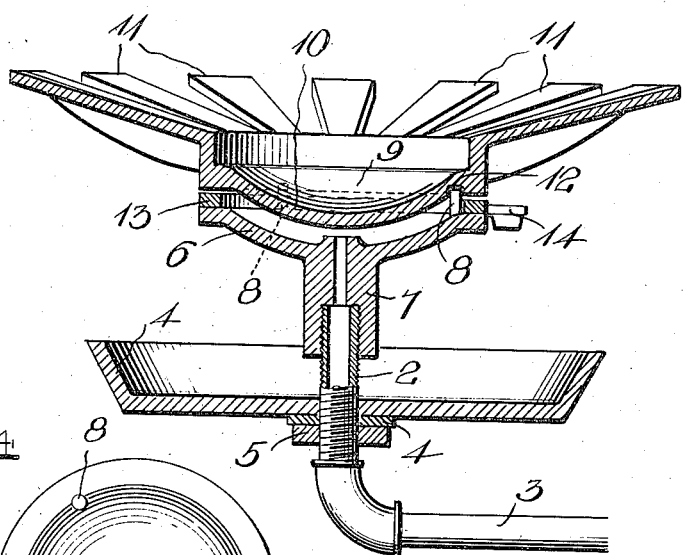
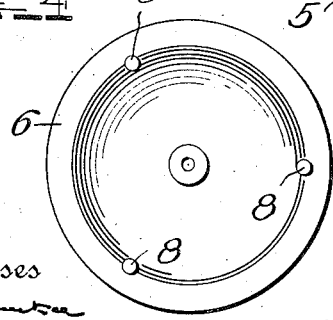
Witnesses
Inventor
J. H. Herriff
by H. B. Willson & Co.
Attorneys

UNITED STATES PATENT OFFICE.

JONAS H. HERRIFF, OF ERIE, KANSAS.

OIL-BURNER.

949,073.  Specification of Letters Patent.   Patented Feb. 15, 1910.

Application filed April 15, 1909. Serial No. 490,004.

*To all whom it may concern:*

Be it known that I, JONAS H. HERRIFF, citizen of the United States, residing at Erie, in the county of Neosho and State of Kansas, have invented certain new and useful Improvements in Oil-Burners; and I do declare the following to be a full, clear, and exact description of the invention, such as will enable others skilled in the art to which it appertains to make and use the same.

This invention relates to improvements in oil burners.

The object of the invention is to provide an oil burner adapted to be placed in the fire box of a stove or furnace, and having means to support fire brick or the like.

The further object is to provide a burner of this character, the parts of which may be readily separated and which is provided with means for keeping the burner opening from becoming clogged up.

With this and other objects in view, the invention consists of certain novel features of construction, combination and arrangement of parts, as will be more fully described and particularly pointed out in the appended claims.

In the accompanying drawings: Figure 1, is a side view of an oil burner constructed in accordance with my invention. Fig. 2, is a top plan view. Fig. 3, is a central vertical section. Fig. 4, is a plan view of the generator disk; and, Fig. 5, is a perspective view of the cleaner ring.

In the embodiment of my invention, I provide a pan 1, which is adapted to rest upon the grate of the stove, or on any other support, and in the center of said pan is formed a threaded aperture through which is screwed an oil conducting pipe 2, the lower end of which projects below the pan a suitable distance to provide a nipple for the attachment for the oil supply pipe 3. The pipe 2 has a fluid pipe connection with an opening in the pan preferably by means of an asbestos washer 4, and a clamping nut 5, arranged on the projecting end of the pipe 2, adjacent to the under side of the pan as shown.

Arranged above the pan 1 is the generator disk 6, which is concaved or cup shape, and has formed on its under side a downwardly projecting nipple 7, the lower end of which is threaded interiorly to receive the threaded upper end of the pipe 2, whereby the disk is supported at a suitable elevation above the pan 1. The nipple 7 is continued to form a projection on the inner or upper side of the disk 6, and the oil passing through the pipe 2 and the nipple 7 is discharged into the disk through said upwardly projecting end of the nipple. On the upper or inner side of the disk 6, near its outer edge, is arranged a series of dowel pins 8.

Arranged above the disk 6, and supported upon the dowel pins 8, is a grate or basket 9, having an annular saucer shaped central portion 10, and a series of radially projecting upwardly inclined brick supporting bars 11, which are spaced suitable distances apart, as shown. The bottom of the central portion 10 of the grate is preferably concave, as shown, and is provided on its under side with a series of sockets or recesses 12 to receive the dowel pins 8, whereby the central portion of the grate is held above and spaced a suitable distance from the upper side of the generator disks 6. When in use, the grate or basket 9 is adapted to hold a pile of fire brick or similar material through which the flame from the burner passes.

Loosely mounted on the outer edge of the generator disk 6, below the outer edge of the central portion 10, of the grate or basket 9, is a cleaner ring 13, said ring being held in operative position on the edge of the disk 6, by means of the dowel pins 8, around which the ring is disposed. The ring is provided at a suitable point with a laterally projecting operating handle 14, by means of which the ring may be shook or oscillated in the space between the upper edge of the disk 6, and the lower outer edge of the grate, thus keeping this space clear and preventing the same from becoming clogged up and interfering with the action of the burner.

In the operation of the device, the oil flows from the upper end of the nipple 7 and into the generator disk 6, from whence it flows out over and around the ring 13, and is ignited at the edge of the space between the outer edges of the disk and grate, the oil being practically vaporized by the time it reaches the discharge space. In starting the burner, some of the oil will flow out over the ring 13 and drip down into the pan 1, where it is ignited and heats the generator disk, so that the oil therein is vaporized by the time it reaches the burning point at the outer edge of the generator disk and grate. The burning oil in the pan 1, also heats the latter so that any further oil dripping thereon from the generator disk will be vaporized, the pan thus serving as an auxiliary generator.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:

1. In an oil burner, a drip pan having connected thereto an oil conducting pipe, a generator disk supported on the upper end of said pipe and communicating therewith to receive the oil passing through the pipe, a brick supporting basket or grate arranged above and supported on said generator disk to provide a burner opening between the outer edge of the disk and grate, and a cleaner ring loosely mounted in said burner opening, whereby the latter is prevented from becoming clogged.

2. In a burner of the character described, a drip pan, an oil conducting pipe arranged therein, a generator disk supported above said pan and communicating with said pipe, a series of dowel pins arranged on said generator disk, a brick supporting grate or basket having in its lower side a series of sockets to receive said dowel pins, whereby the grate is supported at a proper elevation above the disk to form between the outer edge of the same a grate and burner opening, a cleaner ring loosely mounted on the outer edge of said generator disk in said burner space, said ring being held in operative position by said dowel pins, and a handle to operate said rings and keep said burner opening from becoming clogged.

In testimony whereof I have hereunto set my hand in presence of two subscribing witnesses.

JONAS H. HERRIFF.

Witnesses:
 EDWARD A. WICK,
 ARTHUR TOWLES.